US008176306B2

(12) United States Patent
Piwonka

(10) Patent No.: US 8,176,306 B2
(45) Date of Patent: May 8, 2012

(54) BOOT BLOCK

(75) Inventor: Mark Piwonka, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 382 days.

(21) Appl. No.: 12/508,742

(22) Filed: Jul. 24, 2009

(65) Prior Publication Data

US 2011/0022830 A1 Jan. 27, 2011

(51) Int. Cl.
G06F 11/00 (2006.01)
(52) U.S. Cl. ......................................................... 713/1
(58) Field of Classification Search .................. 713/1, 2, 713/188; 726/22, 23, 24, 25
See application file for complete search history.

(56) References Cited

U.S. PATENT DOCUMENTS

| 5,937,063 | A | * | 8/1999 | Davis ............................. 713/187 |
| 6,715,074 | B1 | * | 3/2004 | Chaiken ......................... 713/164 |
| 6,757,838 | B1 | * | 6/2004 | Chaiken et al. ............... 714/5.11 |
| 7,013,384 | B2 | | 3/2006 | Challener |
| 7,487,345 | B2 | * | 2/2009 | Khatri et al. .................. 713/100 |
| 7,533,274 | B2 | | 5/2009 | Freeman |
| 2006/0129795 | A1 | * | 6/2006 | Bulusu et al. ..................... 713/2 |

* cited by examiner

Primary Examiner — M Elamin
(74) Attorney, Agent, or Firm — Chun-Liang Kuo

(57) ABSTRACT

A machine including a processor, a boot block including an immutable segment and a mutable segment, one or more BIOS images stored on the mutable segment of the boot block, and a BIOS manager executed by the processor from the immutable segment of the boot block and configured to determine whether a BIOS of the machine is valid and launch a BIOS replacement process when the BIOS is invalid.

17 Claims, 7 Drawing Sheets

BOOT BLOCK

BACKGROUND

A BIOS is a basic Input/Output system for a machine. The BIOS initializes and controls hardware components and an operating system of the machine. When loading a BIOS to operate on the machine, the machine accesses a BIOS image on the machine. The machine then loads the BIOS image into a ROM of the machine. Once the BIOS image has been loaded into the ROM of the machine, control of the machine is passed to the BIOS.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
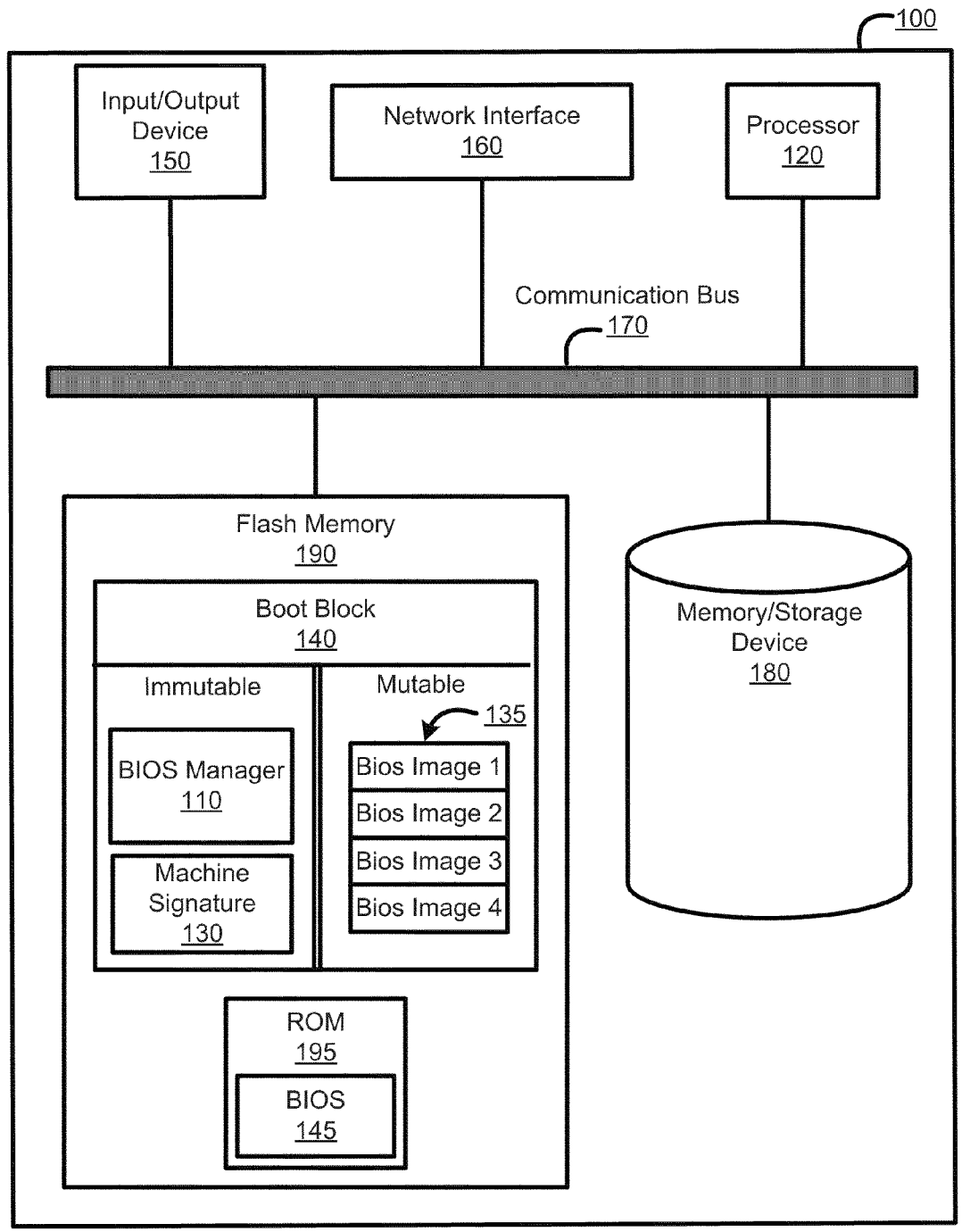
FIG. 1 illustrates a machine with a mutable segment and an immutable segment of a boot block according to an embodiment of the invention.

FIG. 1 illustrates a machine 100 with a mutable segment and an immutable segment of a boot block 140 according to an embodiment of the invention. In one embodiment, the machine 100 is a desktop, a laptop, a server, and/or any device that includes a boot block 140 and utilizes a BIOS 145. As illustrated in FIG. 1, the machine 100 includes a processor 120, one or more input devices 150, a memory/storage device 180, a network interface 160, flash memory 190, and a communication bus 170 for the machine 100 and/or one or more components of the machine 100 to communicate with one another.

Additionally, as illustrated in FIG. 1, the machine 100 and the processor 120 are coupled to the flash memory 140. As shown in FIG. 1, the flash memory 190 stores the boot block 140 and a ROM 195 for the machine 100. Further, in one embodiment, as shown in FIG. 1, the immutable segment stores a BIOS manager 110 and a machine signature 130. Additionally, the mutable segment includes one or more BIOS images 135. In other embodiments, the machine 100 includes additional components and/or is coupled to additional components in addition to and/or in lieu of those noted above and illustrated in FIG. 1.

As noted above, the flash memory 190 stores a boot block 140 and the ROM 195. Additionally, as illustrated in FIG. 1, the boot block 140 and the ROM 195 are stored on separate locations on the flash memory 190 and do not overlap one another. The flash memory 190 is a memory device coupled to the machine 100. In one embodiment, the flash memory 190 includes non-volatile memory configured to store data and/or code. Additionally, as illustrated in FIG. 1, in one embodiment, the flash memory 190 is included in the machine 100.

In other embodiments, the flash memory 190 is not included in the machine 100 and is coupled to the machine 100 through the communication bus 170 and/or the network interface 160. In one embodiment the communication bus 170 is a memory bus. In other embodiments, the communication bus 170 is a data bus. Additionally, the network interface 160 may be a wired or wireless network interface card.

As noted above, the boot block 140 is stored on the flash memory 190. As illustrated in FIG. 1, the boot block 140 is a section of the flash memory 190 which stores data and/or code, such as the BIOS manager 110. In one embodiment, as illustrated in FIG. 1, the boot block 140 also stores one or more BIOS images 135 and a machine signature 130. As shown in FIG. 1, the boot block 140 is segmented into a mutable segment and an immutable segment. Content on the immutable segment of the boot block 140 is protected from edits and deletion. Additionally, content on the mutable segment of the boobtlock 140 can be erased and/or edited by the BIOS manager 110 and/or the machine 100.

As illustrated in FIG. 1, the immutable segment of the boot block 140 includes the BIOS manager 110 and the machine signature 130. As a result, in one embodiment, the BIOS manager 110 and the machine signature 110 are protected against modifications and are not overwritten or deleted. Additionally, as shown in FIG. 1, one or more of the BIOS images 135 are stored on the mutable segment of the boot block 140. As a result, one or more of the BIOS images 135 on the mutable segment can be edited, updated, and/or overwritten. Further, additional content can be included in the mutable segment. In one embodiment, the mutable segment of the boot block 140 is updated to include additional BIOS images 135.

As noted above, the BIOS manager 110 is stored on the immutable segment of the boot block 140. In one embodiment, the BIOS manager 110 is firmware of the machine 100 that is executed when the machine 100 is first powered on. The BIOS manager 110 searches for one or more BIOS images 135 stored on the mutable segment of the boot block 140. Once the BIOS manager 110 has found one or more of the BIOS images 135, the BIOS manager 110 will proceed to select one of the BIOS images 135 to be loaded into the ROM 195 of the machine 100.

A selected BIOS image is a BIOS image which has been chosen to be loaded into the ROM 195 and operate as the BIOS 145 of the machine 100. Once the selected BIOS image 135 has been successfully loaded into the ROM 195, the BIOS manager 110 will proceed to determine whether the BIOS 145 and the selected BIOS image 135 are valid. If the BIOS manager 110 determines that the BIOS 145 or the selected BIOS image 135 are invalid, the BIOS manager 110 will proceed to launch a BIOS replacement process on the machine 100.

As noted above, in one embodiment, the BIOS manager 110 is firmware that is embedded onto the flash memory 140 coupled to the machine 100. Additionally, in one embodiment, the flash memory 190 is included in the machine 100. In another embodiment, the flash memory 190 and the BIOS manager 110 is not included in the machine 100, but is accessible to the machine 100 utilizing a network interface 160 included in the machine 100 or through a communication bus 170 included in or attached to the machine 100. In other embodiments, the BIOS manager 110 is embedded into the machine 100.

As noted above, the machine 100 includes a processor 120. The processor 120 sends data and/or instructions to the components of the machine 100, such as one or more input devices 150, the ROM 195, the BIOS 145 and the BIOS manager 110. Additionally, the processor 120 receives data and/or instruction from components of the machine 100, such as the BIOS manager 110.

As noted above, the BIOS manager 110 searches for one or more BIOS images 135 stored on the mutable segment of the boot block 140. The BIOS images 135 are image files of data and/or code that can be loaded into the ROM 145 of the machine 100 to operate as a BIOS 145 of the machine 100. As noted above, the BIOS images 135 can be edited, updated, and/or overwritten. As illustrated in FIG. 1, in one embodiment, the BIOS images 135 are stored on the mutable segment of the boot block 140. As noted above, the mutable segment of the boot block 140 can additionally be updated to include additional BIOS images 135. In other embodiments, the BIOS images 135 are stored on a memory storage device 180 coupled to the machine 100.

The memory/storage device 180 can be configured to store one or more of the BIOS images 135. In one embodiment, the memory/storage device can be included in the machine 100. In another embodiment, the memory storage device is removable from the machine 100 and is coupled to the machine 100. In other embodiments, the memory/storage device 180 is not physically coupled to the machine 100 and is accessible to the machine 100 using the network interface 160.

Once the BIOS manager 110 has found one or more of the BIOS images 135, the BIOS manager 110 will proceed to select one of the BIOS images 135 to be loaded into the ROM 195 of the machine 100 to operate as the BIOS 145 of the machine 100. In another embodiment, a user can access the machine 100 and select one or more of the BIOS images 135 to be loaded into the ROM 195 using one or more input/output devices 150 coupled to the machine. One or more of the input/output devices 150 are devices that the user can access to input commands and/or receive output from the machine 100. In one embodiment, one or more of the input/output devices 150 include a mouse, a keyboard, and/or a touch screen.

Once the selected BIOS image has been selected by the BIOS manager 110 and/or the user, the BIOS manager 110 can proceed to load the selected BIOS image into a ROM 195 of the machine 100. The ROM 195 is a section of non-volatile memory that the selected BIOS image can be loaded into. In one embodiment, as illustrated in FIG. 1, the ROM 195 is included in the flash memory 190 and includes the BIOS 145 for the machine 100.

The BIOS is firmware for the machine 100 which boots the machine 100, initializes and controls the hardware components and operating system of the machine 100. As illustrated in FIG. 1, in one embodiment, the BIOS 145 is stored on the ROM 195 of the machine 100. In another embodiment, the BIOS 145 is loaded and/or embedded into another portion of the flash memory 190. In other embodiments, the BIOS 145 is loaded and/or embedded onto another memory location of the machine 100.

As noted above, once the selected BIOS image has been successfully loaded into the ROM 195, the BIOS manager 110 will proceed to determine whether the BIOS 145 is valid and whether the selected BIOS image is valid. In determining whether the BIOS 145 is valid, the BIOS manager 110 will execute one or more code measurements on the BIOS 135 loaded into the ROM 195. Additionally, in determining whether the selected BIOS image is valid, the BIOS manager 110 will authenticate a BIOS signature of the selected BIOS image with a machine signature 130 on the machine 100.

One or more code measurements are integrity and security tests executed by the BIOS manager 110 on code of the BIOS 145 loaded into the ROM 195. Additionally, the BIOS signature is a sequence of binary numbers utilized to identify that a corresponding BIOS image is compatible and/or stable with the machine 100. In other embodiments, other suitable BIOS signatures may be employed by the BIOS images 135. As noted above, in authenticating the BIOS signature, the BIOS manager 110 will compare the BIOS signature with a machine signature 130.

The machine signature 130 is a sequence of binary numbers registered for the machine 100 and used to authenticate the BIOS signature of a BIOS image. As illustrated in FIG. 1, in one embodiment, the machine signature 130 is stored on the immutable segment of the boot block 140. In another embodiment, the machine signature 130 can be stored and accessed from the memory/storage device 180.

As noted above, the BIOS manager 110 will determine whether the BIOS 145 is valid and whether the selected BIOS image is valid. The BIOS manager 110 will determine that the BIOS 145 is valid if the BIOS 145 does not fail any of the code measurements executed by the BIOS manager 110. Additionally, the BIOS manager 110 will determine that the selected BIOS image is valid if the BIOS signature of the selected BIOS image matches the machine signature 130.

Further, the BIOS manager 110 will determine that the BIOS 145 is invalid if the BIOS 145 fails one or more of the code measurements executed by the BIOS manager 110. In addition, the BIOS manager 110 will determine that the selected BIOS image is invalid if the BIOS signature of the selected BIOS image does not match the machine signature 130.

If the BIOS manager 110 determines that both the BIOS 145 and the selected BIOS image are valid, the BIOS manager 110 will release control of the machine 100 to the BIOS 145. However, if the BIOS manager 110 determines that the BIOS 145 is invalid or the selected BIOS image is invalid, the BIOS manager 110 will proceed to launch a BIOS replacement process on the machine 100.

The BIOS replacement process is a recovery process on the machine 100 that is launched by the BIOS manager 110 when the BIOS 145 and/or the selected BIOS image are determined to be invalid. In one embodiment, in launching the BIOS replacement process, the BIOS manager 110 will reload the selected BIOS image back into the ROM 195 of the machine 100, create a replacement BIOS image from the BIOS 145 and store the replacement BIOS image in the mutable segment of the boot block 140, and/or select another BIOS image to be loaded into the ROM 195. As a result, in executing the BIOS replacement process the BIOS manager can update the BIOS 145 of the machine 100, replace the BIOS 145 of the machine 100, and/or recover the BIOS 145 of the machine 100.

Additionally, the BIOS manager 110 will choose whether to reload the selected BIOS image back into the ROM 195 of the machine 100, create a replacement BIOS image from the BIOS 145 and store the replacement BIOS image in the mutable segment of the boot block 140, and/or select another BIOS image to be loaded into the ROM 195 in response to whether the selected BIOS image is invalid and whether the BIOS 145 is invalid.

In one embodiment, if the BIOS manager 110 determines that the BIOS 145 is invalid and the selected BIOS image is valid, the BIOS manager 110 will choose to reload the selected BIOS image back into the ROM 195 of the machine 100 to replace the invalid BIOS 145. In another embodiment, if the BIOS manager 110 determines that the BIOS 145 is valid and the selected BIOS image is invalid, the BIOS manager 110 will then proceed to create a replacement BIOS image from the BIOS 145 loaded into the ROM 195 and store the replacement BIOS image on the mutable segment of the boot block 140. Additionally, the BIOS manager 110 can also overwrite the selected BIOS image on the mutable segment of the boot block 140 with the replacement image.

In other embodiments, if the BIOS manager 110 determines that the BIOS 145 is invalid and the selected BIOS image is also invalid, the BIOS manager 110 will proceed to select another BIOS image from the mutable segment of the boot block 140 or the memory/storage device 180. Once the BIOS manager 110 has selected another BIOS image, the BIOS manager 110 will proceed to load the other BIOS image into the ROM 195 to operate as a replacement BIOS for the machine 100. Additionally, the BIOS manager 110 can erase the selected BIOS image from the mutable segment of the boot block 140. In other embodiments, the BIOS manager 110 can overwrite the selected BIOS image with the other BIOS image.

Additionally, in one embodiment, when overwriting the selected BIOS image on the mutable segment of the boot block 140, the BIOS manager 110 will initially erase the BIOS signature from the selected BIOS image before erasing the selected BIOS image from the boot block 140. Once the selected BIOS image has been erased from the mutable segment of the boot block 140, the BIOS manager 110 will proceed to load the replacement BIOS image or the other BIOS image onto the mutable segment of the boot block 140. After the replacement BIOS image or the other BIOS image has been fully written to the mutable segment of the boot block 140, the BIOS manager 110 will proceed to sign the replacement BIOS image or the other BIOS image with a BIOS signature that matches the machine signature 130.

Figure 2:
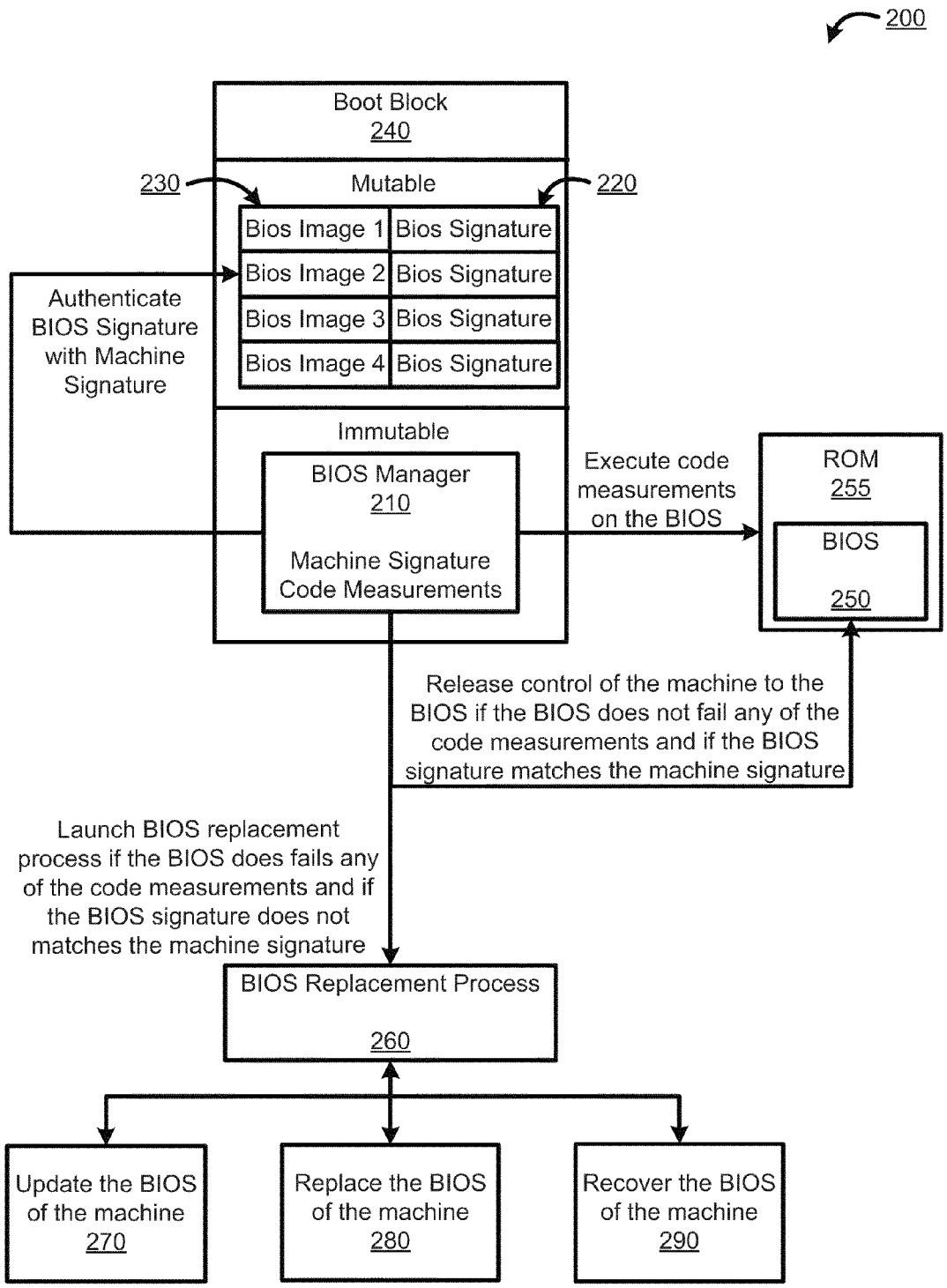
FIG. 2 illustrates a block diagram of a BIOS manager determining whether a BIOS and a selected BIOS image are valid according to an embodiment of the invention.

FIG. 2 illustrates a block diagram of a BIOS manager 210 determining whether a BIOS 250 and a selected BIOS image are valid according to an embodiment of the invention. As illustrated in FIG. 2, the BIOS manager 210 is stored on an immutable segment of a boot block 240. As noted above, in one embodiment, the boot block 240 is stored on flash memory. Additionally, as illustrated in FIG. 2, one or more BIOS images 230 are stored on a mutable segment of the boot block 240.

As noted above and illustrated in FIG. 2, the BIOS manager 210 will initially select one of the BIOS images 230 to be loaded into a ROM 255 of a machine 200 to operate as the BIOS 250 of the machine.200. In one embodiment, as shown in FIG. 2, BIOS image 2 is selected by the BIOS manager 210 to be loaded into the ROM 255. Additionally, as noted above, after one of the BIOS images 230 have been selected to be loaded into the ROM 255 of the machine 200, the BIOS manager 210 will proceed to determine whether the BIOS 250 is valid and whether the selected BIOS image is valid.

As illustrated in FIG. 2, in determining whether the BIOS 250 is valid, the BIOS manager 210 will execute one or more code measurements on the BIOS 250. Additionally, in determining whether the selected BIOS image is valid, the BIOS manager 210 will authenticate a BIOS signature 220 of the selected BIOS image with a machine signature. As illustrated in FIG. 2, in one embodiment, the BIOS signatures 220 are stored on the mutable segment of the boot block 240 and the machine signature is stored on the immutable segment of the boot block 240.

Additionally, as shown in FIG. 2, each of the BIOS images 230 have a corresponding BIOS signature 220. In one embodiment, the BIOS signatures 220 are included as part of the BIOS images 230. In other embodiments, the BIOS signatures 220 are not included as part of the BIOS images 230 and are stored as separate files which correspond to the BIOS images 230.

As illustrated in FIG. 2, in determining whether the BIOS 250 is valid, the BIOS manager 210 will execute one or more code measurements on the BIOS 250. As noted above, one or more of the code measurements verify the integrity and a security of the code included in the BIOS 250 loaded into the ROM 255. Further, as noted above and illustrated in FIG. 2, in determining whether the selected BIOS image is valid, the BIOS manager 210 will proceed to authenticate the BIOS signature of the selected BIOS image with the machine signature.

As noted above, if the BIOS manager 210 determines that the BIOS signature of the selected BIOS image does not match the machine signature, then the selected BIOS image is invalid. Additionally, if the BIOS manager 210 determines that the BIOS 250 fails one or more of the code measurements, then the BIOS 250 is invalid.

As illustrated in FIG. 2, if the BIOS 250 and the selected BIOS image are determined to be valid, the BIOS manager 210 will release control of the machine 200 to the BIOS 250. Further, as illustrated in FIG. 2, if the BIOS manager 210 determines that the BIOS 250 or the selected BIOS image are invalid, the BIOS manager 210 will proceed to launch a BIOS replacement process 260. As illustrated in FIG. 2, when executing the BIOS replacement process 250, the BIOS manager 210 can update the BIOS 250 of the machine 270, replace the BIOS 250 of the machine 280, and/or recovere the BIOS 250 of the machine 290.

Figure 3:
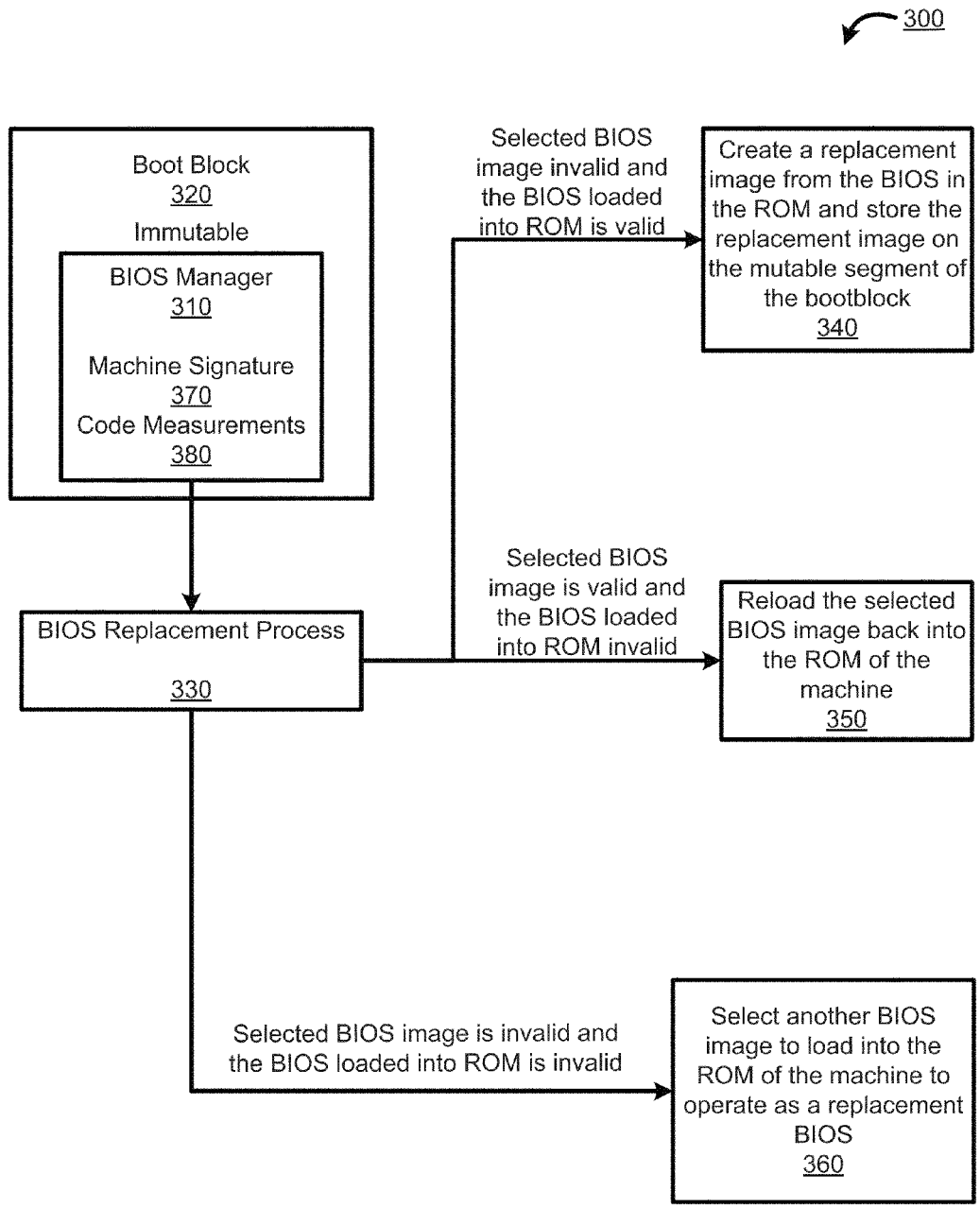
FIG. 3 illustrates a block diagram of a BIOS manager launching a BIOS replacement process according to an embodiment of the invention.

FIG. 3 illustrates a block diagram of a BIOS manager 310 launching a BIOS replacement process 330 according to an embodiment of the invention. As illustrated in FIG. 3, the BIOS manager 310 is stored on an immutable segment of a boot block 320. As noted above, the BIOS manager 310 will select a BIOS image from a mutable segment of the boot block 320 and load the selected BIOS image into a ROM of a machine 300 to operate as a BIOS of the machine 300.

Additionally, as noted above, once the selected BIOS has been loaded into the ROM, the BIOS manager 310 will determine whether the selected BIOS image is invalid and determine whether the BIOS is valid. If the BIOS manager 310 determines that the selected BIOS image and/or the BIOS are invalid, the BIOS manager 310 will proceed to launch the BIOS replacement process 330.

As noted above, in one embodiment, the BIOS manager 310 will determine that the selected BIOS image is invalid if a BIOS signature of the selected BIOS image does not match a machine signature 370. If the BIOS signature matches the machine signature 370, then the BIOS manager 310 will determine that the selected BIOS image is valid. Additionally, in one embodiment, the BIOS manager 310 will determine that the BIOS loaded into the ROM is invalid if the BIOS fails any code measurements executed by the BIOS manager 310. If the BIOS does not fail any of the code measurements, then the BIOS manager 310 will determine that the BIOS is valid.

As illustrated in FIG. 3, in one embodiment, in launching the BIOS replacement process 330, the BIOS manager 310 can create a replacement BIOS image 340, reload a BIOS image 350, and/or select another BIOS image to load into a ROM of the machine 300 360. Additionally, as illustrated in FIG. 3 and as noted above, in one embodiment, the BIOS manager 310 will choose whether to create a replacement BIOS image 340, reload a BIOS image 350, and/or select another BIOS image 360 in response to whether the selected BIOS image is invalid and whether the BIOS is invalid.

As noted above, and illustrated in FIG. 3, if the selected BIOS image is invalid and the BIOS loaded into the ROM is valid, the BIOS manager 310 will proceed to create a replacement BIOS image from the valid BIOS in the ROM and store the replacement image on the mutable segment of the boot block 340. As noted above, in one embodiment, the BIOS manager 310 will additionally overwrite the selected BIOS image determined to be invalid.

Additionally, as illustrated in FIG. 3, if the BIOS manager 310 determines that selected BIOS image is valid and the BIOS loaded into the ROM is invalid, the BIOS manager 310 will proceed to reload the selected BIOS image back into the ROM of the machine 350.

Further, as illustrated in FIG. 3, if the BIOS manager 310 determines that the selected BIOS image is invalid and the BIOS loaded into the ROM is invalid, then the BIOS manager 310 will proceed to select another BIOS image to load into the ROM of the machine 300 to operate as a replacement BIOS 360. As noted above, in one embodiment, the BIOS images are stored on the mutable segment of the boot block 320. In other embodiments, the BIOS images are stored on a removable storage medium coupled and/or accessible to the machine 300.

Figure 4:
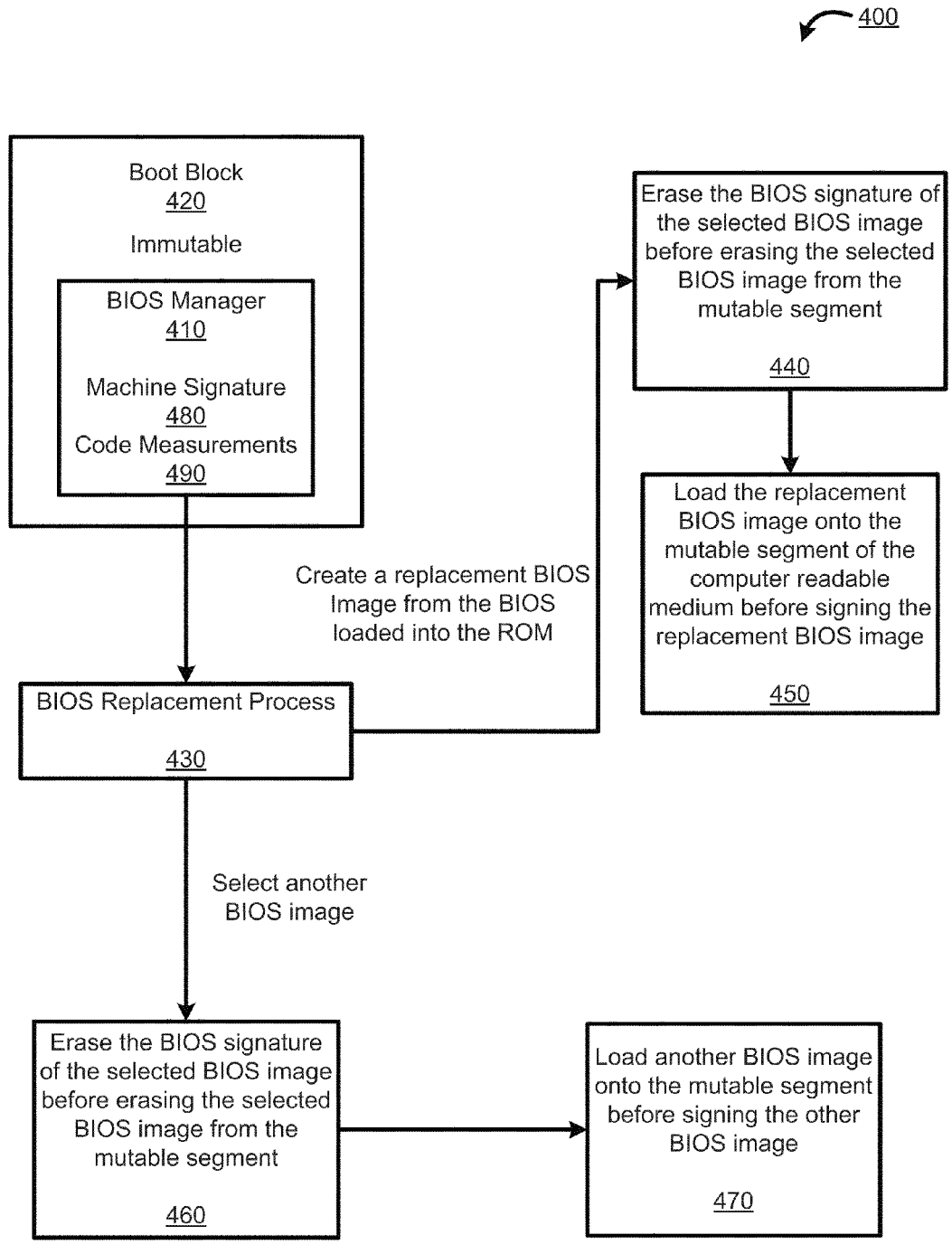
FIG. 4 illustrates a block diagram of a BIOS manager launching a BIOS replacement process according to another embodiment of the invention.

FIG. 4 illustrates a block diagram of a BIOS manager 410 launching a BIOS replacement process 430 according to another embodiment of the invention. As noted above and illustrated in FIG. 4, in one embodiment, the BIOS replacement process 430 includes creating a replacement BIOS image from a BIOS loaded into a ROM of a machine 400 or selecting another BIOS image to be loaded into the ROM of the machine 400 to operate as a replacement BIOS for the machine 400.

As noted above, in one embodiment, the BIOS manager 410 proceeds to create a replacement BIOS image from a BIOS loaded into the ROM when the BIOS is valid and a selected BIOS image is invalid. Additionally, as noted above, the BIOS manager 410 selects another BIOS image to be loaded into the ROM when the BIOS is invalid and the selected BIOS image is invalid. As illustrated in FIG. 4, in one embodiment, the BIOS manager 410 selects another BIOS image from the mutable segment of a boot block 420. In other embodiments, the BIOS manager 410 selects another BIOS image from a removable storage medium coupled to the machine 400.

Additionally, as noted above, the BIOS manager 410 can erase the selected BIOS image from the mutable segment of the boot block 420 when the replacement BIOS has been created and/or when another BIOS image is selected to be loaded into the ROM. In one embodiment, after creating the replacement BIOS image from the BIOS loaded into the ROM, the BIOS manager 410 will erase the BIOS signature of the selected BIOS image before erasing the selected BIOS image from the mutable segment of the boot block 420 440.

Once the selected BIOS image has been erased from the mutable segment, the BIOS manager 410 can proceed to load the replacement BIOS image onto the mutable segment. Once the replacement BIOS image has been loaded onto the mutable segment, the BIOS manager will proceed to sign the replacement BIOS image with a BIOS signature that matches a machine signature 480 450.

Additionally, as illustrated in FIG. 4, if the BIOS manager 410 selects another BIOS image to be loaded into the ROM, the BIOS manager 410 will erase the BIOS signature of the selected BIOS image before erasing the selected BIOS image from the mutable segment of the boot block 420. If the other BIOS image selected is stored on a removable storage medium, the BIOS manager 410 will proceed to load the other BIOS image onto the mutable segment. The BIOS manager 410 will then proceed to sign the other BIOS image with a BIOS signature.

Figure 5:
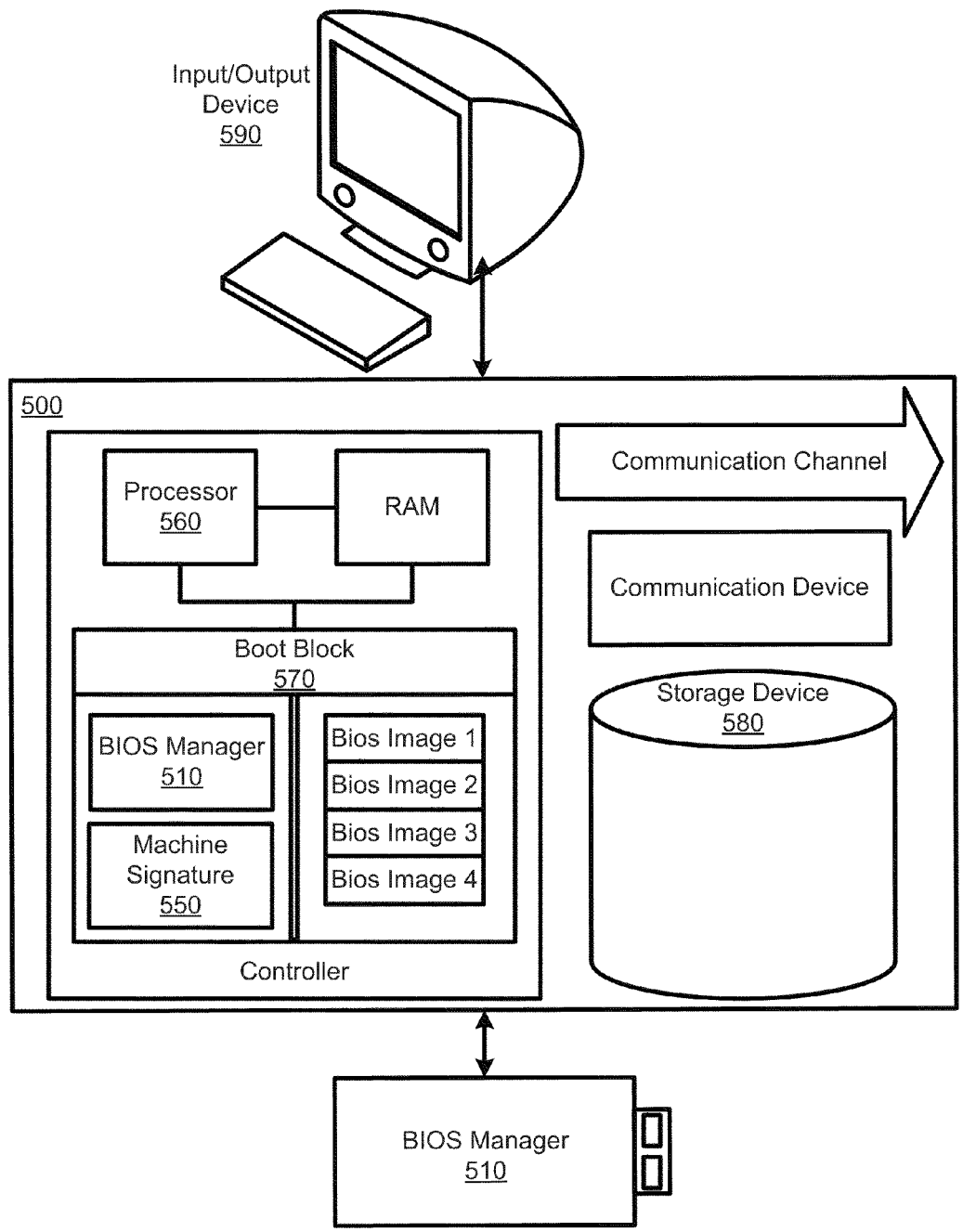
FIG. 5 illustrates a machine with an embedded BIOS manager and a BIOS manager stored on a flash memory being accessed by the machine according to an embodiment of the invention.

FIG. 5 illustrates a machine 500 with an embedded BIOS manager 510 and a BIOS manager 510 stored on a flash memory being accessed by the machine 500 according to an embodiment of the invention. For the purposes of this description, the flash memory includes non-volatile memory which contains, stores, communicates, or transports the application for use by or in connection with the machine 500. Additionally, as noted above, in one embodiment, the flash memory includes an immutable segment configured to store the BIOS manager 510. Further, in other embodiments, the BIOS manager 510 is firmware that is embedded into one or more components of the machine 500.

Figure 6:
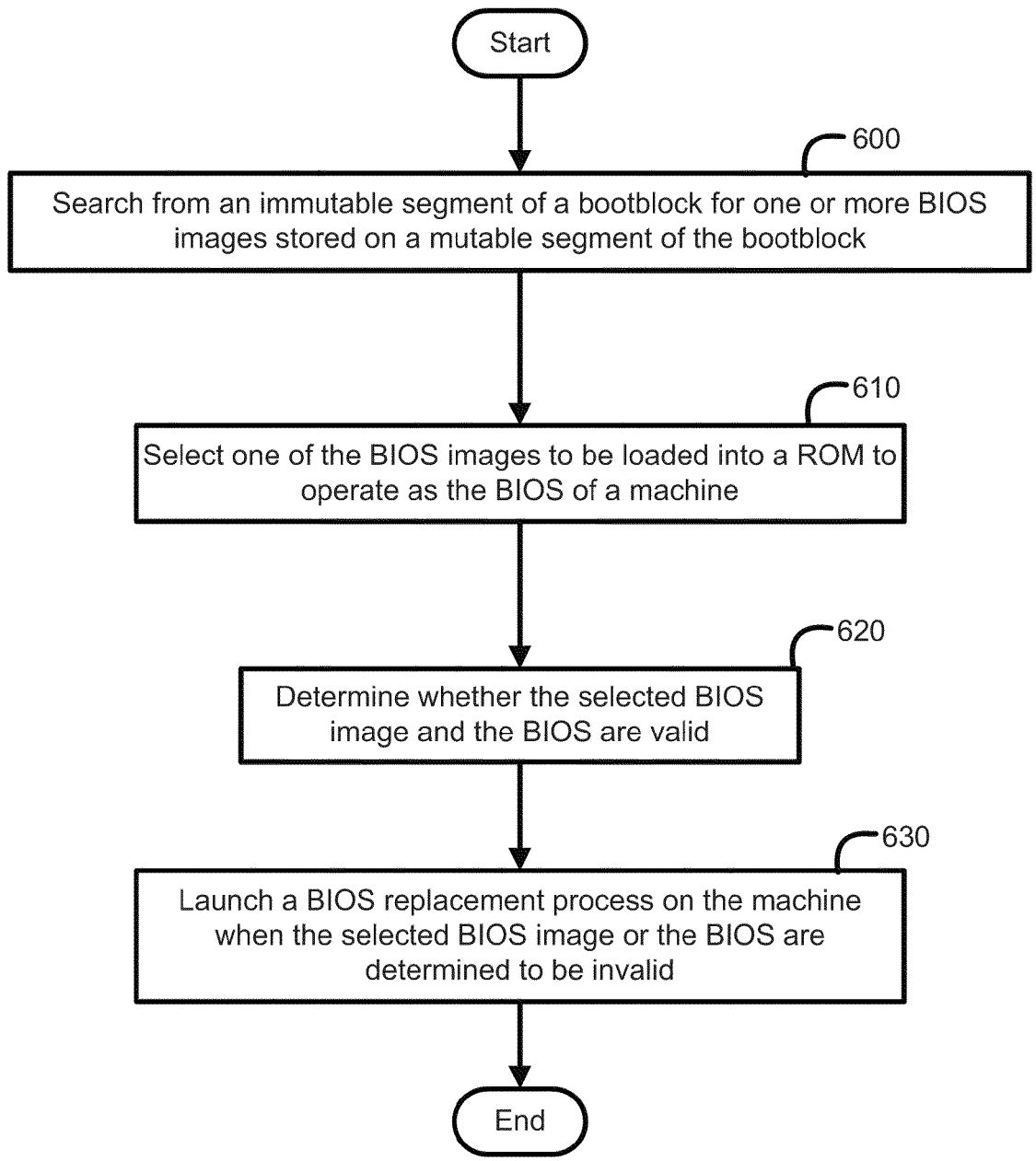
FIG. 6 is a flow chart illustrating a method for managing a BIOS according to an embodiment of the invention.

FIG. 6 is a flow chart illustrating a method for managing a BIOS according to an embodiment of the invention. The method of FIG. 6 uses a BIOS manager on a machine that is stored and launched from an immutable segment of a boot block, BIOS images, a machine signature, and one or more code measurements launched by the BIOS manager. In other embodiments, the method of FIG. 6 uses additional components and/or devices in addition to and/or in lieu of those noted above and illustrated in FIGS. 1, 2, 3, 4, and 5.

As noted above, the BIOS manager is stored on an immutable segment of the boot block. Additionally, the BIOS manager initially searches for one or more BIOS images stored on a mutable segment of the boot block 600. Once the BIOS manager has found one or more BIOS images on the mutable segment of the boot block, the BIOS manager will select one of the BIOS images to be loaded into a ROM to operate as a BIOS of a machine 610. In one embodiment, the selected BIOS image chosen to be loaded into the ROM is the most recently used BIOS image.

Once the BIOS manager has loaded the selected BIOS image into the ROM, the BIOS manager will proceed to determine whether the selected BIOS image is valid and whether the BIOS 620 is valid. As noted above, in determining whether the selected BIOS image is valid, the BIOS manager authenticates a BIOS signature of the selected BIOS image. Additionally, in determining whether the BIOS is valid, the BIOS manager executes one or more code measurements on the BIOS loaded into the ROM.

As noted above, the selected BIOS image is valid if the BIOS signature of the selected BIOS image matches a machine signature of the machine. Further, the BIOS is valid if the BIOS passes all of the code measurements executed by the BIOS manager. However, if the BIOS manager determines that the BIOS signature does not match the machine signature, then the selected BIOS image is invalid. Additionally, if the BIOS fails one or more of the code measurements, then the BIOS is invalid.

Further, as noted above, in one embodiment, if the BIOS manager determines that the selected BIOS image and the BIOS are valid, the BIOS manager will release control of the machine to the BIOS loaded into the ROM. However, if the BIOS manager determines that the selected BIOS image and/or the BIOS are invalid, the BIOS manager proceeds to launch a BIOS replacement process on the machine 630. As noted above, the BIOS replacement process is a recovery process on the machine.

As noted above, the BIOS replacement process includes at least one from the group consisting of reloading the BIOS image back into the ROM of the machine, creating a replacement image from the BIOS in the ROM and overwriting the BIOS image on the mutable segment of the boot block with the replacement image, and/or selecting another BIOS image from the mutable segment of the boot block or from a removable storage medium to load into the ROM of the machine to operate as a replacement BIOS. Additionally, in executing the BIOS replacement process, the BIOS manager can update the BIOS of the machine, replace the BIOS of the machine, and/or recover the BIOS of the machine.

The method is then complete or the BIOS manager continues to determine whether the selected BIOS image and the BIOS are valid and executes the BIOS recovery process when the selected BIOS image and/or the BIOS are determined to be invalid. In other embodiments, the method of FIG. 6 includes additional steps in addition to and/or in lieu of those depicted above.

Figure 7:
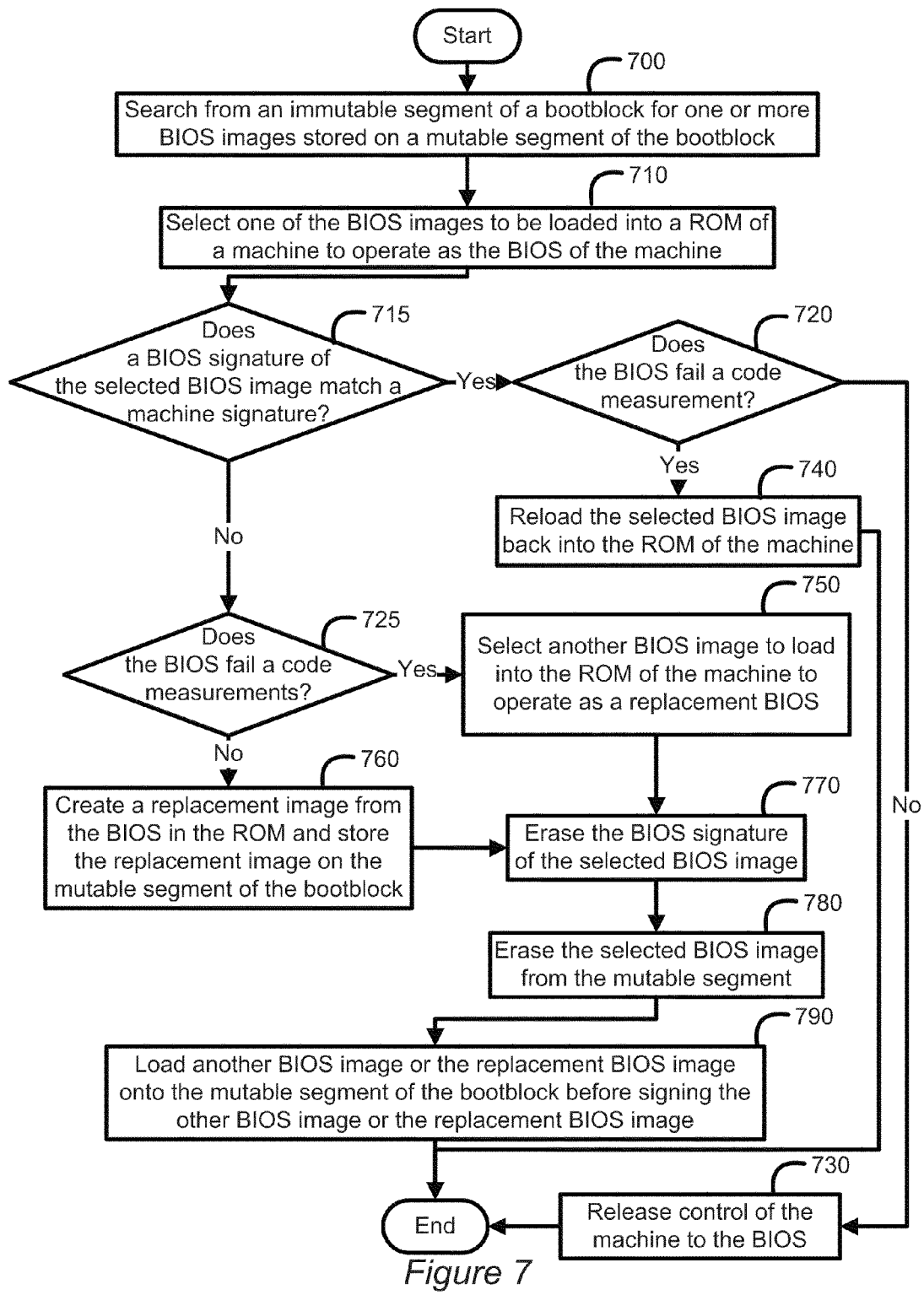
FIG. 7 is a flow chart illustrating a method for managing a BIOS according to another embodiment of the invention.

FIG. 7 is a flow chart illustrating a method for managing a BIOS according to another embodiment of the invention. Similar to the method of FIG. 6, the method of FIG. 7 uses a BIOS manager on a machine that is stored and launched from an immutable segment of a boot block, BIOS images, a machine signature, and one or more code measurements launched by the BIOS manager. In other embodiments, the method of FIG. 7 uses additional components and/or devices in addition to and/or in lieu of those noted above and illustrated in FIGS. 1, 2, 3, 4, and 5.

As noted above, the BIOS manager is stored and launched from the immutable segment of the boot block. Additionally, in one embodiment, the BIOS manager will initially search a mutable segment of the boot block for one or more BIOS images 700. As noted above, one or more BIOS images are firmware images stored on the mutable segment of the boot block that can be loaded into a ROM of the machine to operate as a BIOS of the machine.

Once the BIOS manager has found one or more BIOS images, the BIOS manager will select one of the BIOS images to be loaded into a ROM of a machine to operate as the BIOS of the machine 710. As noted above, in one embodiment, the image selected to be loaded into the ROM of the machine is a most recently used BIOS image. The BIOS manager will load the selected BIOS image into the ROM and proceed to determine whether the selected BIOS image is valid and whether the BIOS is valid. As noted above, in determining whether the selected BIOS image is valid, the BIOS manager will proceed to authenticate a BIOS signature of the selected BIOS image with a machine signature. Additionally, in determining whether the BIOS is valid, the BIOS manager will execute one or more code measurements on the BIOS loaded in the ROM.

As illustrated in FIG. 7, in one embodiment, the BIOS manager will initially determine whether the BIOS signature of the selected BIOS image matches a machine signature 715? As noted above, in one embodiment, the machine signature is additionally stored on the immutable segment of the boot block. In other embodiments, the machine signature is stored on additional devices accessible to the machine.

If the BIOS signature of the selected BIOS image matches the machine signature, the BIOS manager will determine that the BIOS image is valid and proceed to execute one or more code measurements on the BIOS loaded into the ROM. The BIOS manager will proceed to determine whether the BIOS fails one or more of the code measurements 720. If the BIOS does not fail any of the code measurements, the BIOS manager will determine that both the selected BIOS image and the BIOS are valid and release control of the machine to the BIOS 730. The method will then be complete.

However, if the BIOS does fail one or more of the code measurements, the BIOS manager will determine that the selected BIOS image is valid and the BIOS is invalid. The BIOS manager will then proceed to reload the selected BIOS image, which has been determined to be valid, back into the ROM of the machine to operate as the BIOS of the machine 740. The method will then be complete.

In another embodiment, if the BIOS manager determined in step 715 that the BIOS signature of the selected BIOS does not match the machine signature, the BIOS manager will determine that the selected BIOS image is invalid. The BIOS manager will then proceed to step 725 to determine whether the BIOS loaded into the ROM also fails one or more code measurements executed by the BIOS manager.

If the BIOS does not fail any of the code measurements, the BIOS manager will determine that the BIOS loaded into the ROM is valid and proceed to create a replacement image from the BIOS loaded into the ROM and store the replacement image on the mutable segment of the boot block 760. As noted above, in one embodiment, BIOS manager can overwrite the selected BIOS image with the replacement image.

However, if the BIOS loaded into the ROM fails one or more of the code measurements, the BIOS manager will proceed to select another BIOS image to load into the ROM of the machine to operate as a replacement BIOS 750. As noted above, in one embodiment, the additional BIOS selected can be stored on the mutable segment of the boot block. In other embodiments, the additional BIOS selected can be stored on a removable storage medium coupled to the machine, such as a compact disc or a USB storage device.

Once the BIOS manager has selected another BIOS image in step 750 or created a replacement BIOS image in step 760, the BIOS manager will proceed to erase the BIOS signature from the selected BIOS image determined to be invalid 770. The BIOS manager will then erase the selected BIOS image from the mutable segment of the boot block 780. After the selected BIOS image has been deleted from the mutable segment of the boot block, the BIOS manager will proceed to load another BIOS image or the replacement BIOS image onto the mutable segment of the boot block. Once the other BIOS image or the replacement has finished loading onto the mutable segment of the boot block, the BIOS manager will sign the replacement BIOS image or the other BIOS image 790.

The method is then complete or the BIOS manager continues to determine whether the selected BIOS image and the BIOS are valid and launches the BIOS recovery process when the selected BIOS image and/or the BIOS are determined to be invalid. In other embodiments, the method of FIG. 7 includes additional steps in addition to and/or in lieu of those depicted in FIG. 7.

By storing a BIOS manager on an immutable segment of a boot block, a machine can maintain stability and security when loading, replacing and/or updating a BIOS of the machine. Additionally, by storing one or more BIOS images on a mutable segment of the boot block, a machine can continually be updated to support new devices and/or components available to the machine.

What is claimed is:

1. A machine comprising:
a processor;
a boot block including an immutable segment and a mutable segment;
one or more BIOS images stored on the mutable segment of the boot block; and
a BIOS manager executed by the processor from the immutable segment of the boot block and configured to determine whether a BIOS or a selected BIOS image of the machine is valid by authenticating a BIOS signature of the selected BIOS image with a machine signature from the immutable segment and by executing one or more code measurements on the BIOS;

wherein the BIOS manager launches a BIOS replacement process when the BIOS or the selected BIOS image is invalid.

2. The machine of claim 1 wherein one of the BIOS images stored on the immutable segment of the boot block is selected by the BIOS manager to be loaded into a ROM of the machine and operate as the BIOS of the machine.

3. The machine of claim 1 wherein the boot block is stored on a flash memory coupled to the processor.

4. The machine of claim 3 wherein the boot block and the ROM are stored in separate locations of the flash memory and do not overlap one another.

5. The machine of claim 1 wherein the mutable segment of the boot block is updated to include one or more additional BIOS images, 6. A method for managing a BIOS comprising:
searching from an immutable segment of a boot block for one or more BIOS images stored on a mutable segment of the boot block;
selecting one of the BIOS images to be loaded into a ROM of a machine to operate as the BIOS of the machine;
determining whether the selected BIOS image and the BIOS are valid by authenticating a BIOS signature of the selected BIOS image with a machine signature from the immutable se tent and executing one or ore code measurements on the BIOS; and
launching a BIOS replacement process on the machine when the selected BIOS image or the BIOS are determined to be invalid.

7. The method for managing a BIOS of claim 6 wherein the BIOS replacement process includes at least one from the group consisting of updating the BIOS of the machine, replacing the BIOS of the machine, and recovering the BIOS of the machine.

8. The method for managing a BIOS of claim 7 wherein the selected BIOS image is invalid when the BIOS signature of the selected BIOS image does not match a machine signature stored on the immutable segment of the boot block.

9. The method for managing a BIOS of claim 7 wherein the BIOS is invalid when the BIOS in the ROM fails one or more of the code measurements executed from the immutable segment of the boot block.

10. The method for managing a BIOS of claim 7 further comprising the BIOS replacement process reloading the selected BIOS image back into the ROM of the machine when the BIOS in the ROM is invalid and when the selected BIOS image on the mutable segment of the boot block is valid.

11. The method for managing a BIOS of claim 7 further comprising the BIOS replacement process creating a replacement image from the BIOS in the ROM and overwriting the selected BIOS image on the mutable segment of the boot block with the replacement image when the BIOS in the ROM is valid and when the selected BIOS image on the mutable segment of the boot block is invalid.

12. The method for managing a BIOS of claim 7 further comprising the BIOS replacement process selecting another BIOS image from the mutable segment of the boot block or a removable storage medium to load into the ROM of the machine to operate as a replacement BIOS when the BIOS in the ROM is invalid and when the BIOS image on the mutable segment of the boot block is invalid.

13. The method for managing a BIOS of claim 7 further comprising releasing control of the machine to the BIOS when the BIOS in the ROM is valid and when the selected BIOS image on the mutable segment of the boot block is valid.

14. A non-transitory computer-readable program in a computer-readable medium comprising:
a BIOS manager launched from an immutable segment of the computer readable memory and configured to select and load a BIOS image from a mutable segment of the computer readable memory into a ROM of a machine to operate as a BIOS of the machine;
wherein the BIOS manager is additionally configured to determine whether a selected BIOS image and the BIOS are valid by authenticating a BIOS signature of the selected BIOS image with a. machine signature from the immutable segment and executing one or more code measurements on the BIOS; and
wherein the BIOS manager is further configured to launch a BIOS replacement process when the selected BIOS image or the BIOS are invalid.

15. The computer-readable program in a computer-readable medium of claim 14 wherein the BIOS replacement process includes at least one from the group consisting of reloading the selected BIOS image back into the ROM of the machine, creating a replacement BIOS image from the BIOS in the ROM and storing the replacement BIOS image on the mutable segment of the boot block, and selecting another BIOS image from the mutable segment of the boot block to load into the ROM of the machine to operate as a replacement BIOS.

16. The computer-readable program in a computer-readable medium of claim 15 wherein the BIOS manager is further configured to erase a BIOS signature of the selected BIOS image before erasing the selected BIOS image from the mutable segment of the computer readable medium when the selected BIOS image is invalid 17. The computer-readable program in a computer-readable medium of claim 16 wherein the BIOS manager is additionally configured to load a replacement BIOS image or load another BIOS image onto the mutable segment of the computer readable medium before signing the replacement BIOS image or the other BIOS image with the BIOS signature nature when the selected BIOS image is invalid.

* * * * *

UNITED STATES PATENT AND TRADEMARK OFFICE
CERTIFICATE OF CORRECTION

PATENT NO. : 8,176,306 B2  
APPLICATION NO. : 12/508742  
DATED : May 8, 2012  
INVENTOR(S) : Mark Piwonka Page 1 of 1

It is certified that error appears in the above-identified patent and that said Letters Patent is hereby corrected as shown below:

Column 11, line 20, in Claim 5, delete "images," and insert -- images. --, therefor.

Column 11, line 30, in Claim 6, delete "se tent" and insert -- segment --, therefor.

Column 11, line 30, in Claim 6, delete "ore" and insert -- more --, therefor.

Column 12, line 26, in Claim 14, delete "a." and insert -- a --, therefor.

Column 12, line 47, in Claim 16, delete "invalid" and insert -- invalid. --, therefor.

Column 12, line 54, in Claim 17, before "when" delete "nature".

Signed and Sealed this  
Fifth Day of March, 2013

Teresa Stanek Rea  
*Acting Director of the United States Patent and Trademark Office*